United States Patent [19]

Frisch et al.

[11] Patent Number: 4,582,879

[45] Date of Patent: Apr. 15, 1986

[54] REACTION INJECTION MOLDING PROCESS AND REACTION INJECTION MOLDED PRODUCTS

[76] Inventors: Kurt C. Frisch, 17986 Park La., Grosse Ile, Mich. 48138; Kaneyoshi Ashida, 23560 E. Newell Cir., Farmington Hills, Mich. 48024; Jozef L. M. van der Loos, Rijksweg Zuid 146, 6134 AE Sittard; Albert A. van Geenen, Merkelbeekerstraat 82, 6441 KM Brunssum, both of Netherlands

[21] Appl. No.: 592,081

[22] Filed: Mar. 22, 1984

[51] Int. Cl.$^4$ .............................................. C08L 75/00
[52] U.S. Cl. .................................... 525/424; 264/240; 264/331.19; 525/903
[58] Field of Search ....................... 525/424, 903, 454; 264/240, 331.19

[56] References Cited

U.S. PATENT DOCUMENTS

| | | | |
|---|---|---|---|
| 3,245,961 | 4/1966 | Fetscher et al. | 528/45 |
| 3,304,291 | 2/1967 | Dachs et al. | 528/312 |
| 3,511,893 | 5/1970 | Schaeffer et al. | 525/454 |
| 4,501,821 | 2/1985 | Hodek et al. | 502/155 |

FOREIGN PATENT DOCUMENTS

| | | |
|---|---|---|
| 905040 | 7/1972 | Canada . |
| 918008 | 1/1973 | Canada . |
| 905823 | 12/1945 | France . |
| 1067153 | 5/1967 | United Kingdom . |
| 1099265 | 1/1968 | United Kingdom . |

OTHER PUBLICATIONS

Frisch et al., "Recent Advances on Interpenetrating Polymer Networks", 22 *Polymer Eng. and Sci.*, No. 17, Dec. 1982, pp. 1143–1152.

Hedrick et al., "A New RIM System from Nylon 6 Block Co-polymers: Chemistry and Structure", AIChe Nat. Summer Meeting, Det., MI (8/81).

Allen et al., "Caprolactam Based Block Copolymers using Polymeric Activators", Die Angewandte Makromolekulare Chemie, vol. 58/59, No. 844, pp. 321–343, (1977).

*Primary Examiner*—Theodore E. Pertilla
*Attorney, Agent, or Firm*—Cushman, Darby & Cushman

[57] ABSTRACT

A reaction injection molding process is disclosed comprising:

introducing a mixture of substantially stable reactant streams into a mold, said mixture, in the aggregate, containing polyamide polymer forming compounds and polyurethane polymer forming compounds, said polyamide polymer forming compounds including lactam, an anionic polymerization catalyst and a polymerization activator, said polyurethane polymer forming compounds including a polyol, a polyisocyanate, a chain extender if desired, and a polyurethane polymerization catalyst, said polyamide polymer forming compounds and said polyurethane forming compounds reacting to respectively form polyamide and polyurethane polymers in said mold to thereby yielding a reaction injection molded product composed of said polymers; and recovering said product from said mold.

21 Claims, No Drawings

REACTION INJECTION MOLDING PROCESS AND REACTION INJECTION MOLDED PRODUCTS

The invention relates to a process for preparing an object by reacting polyamide forming compounds and polyurethane forming compounds in a mold and more particularly to a reaction injection molding process, and the reaction injection molded products.

BACKGROUND OF THE INVENTION

Reaction injection molding (RIM) is a one-shot injection method of liquid components usually by impingement into a closed mold where rapid polymerization occurs resulting in a molded plastic product.

The pressures employed are much lower than in conventional injection molding processes.

In a RIM process, the viscosity of the materials fed to a mold is about 50 to 10,000 cps, preferably about 1500 cps, at injection temperatures varying from room temperature for urethanes to about 150° C. for lactams. Mold temperatures in a RIM process typically range from about 100° C. to about 220° C. The mold pressures generally range from about 1 bar to 100 bar, more particularly 1-30 bar. At least one component in the RIM formulation consists of monomers and adducts thereof that are polymerized to a polymer in the mold.

RIM differs from injection molding in a number of important respects. The main distinction between injection molding and RIM resides in the fact that in RIM, a chemical reaction takes place in the mold to transform a monomer or adducts to a polymeric state. Injection molding is conducted at pressures of about 700 bar to 1400 bar in the mold cavity by melting a solid resin and conveying it into a mold maintained at room temperature and the molten resin at about 150° C. to 350° C. At an injection temperature of about 150° C. to 350° C., viscosity of the molten resin in an injection molding process is generally in the range of 50,000 cps to 1,000,000 cps and is typically about 200,000 cps. In injection molding processes, the solidification of the resins occurs in about 10 to 90 seconds, depending on the size of the molded product. Subsequently, the molded product is removed from the mold. There is no chemical reaction taking place in an injection molding process when the resin is introduced into a mold.

For practical purposes, in a RIM-process the chemcal reaction must take place rapidly in less than about 2 minutes for smaller items. Presently, urethanes are commercially available for RIM processing although systems based on nylon and epoxy are said to be in development.

In connection with nylons in general, the following developments of the anionic polymerization nylon are broadly germane.

Polymerizing a lactam to obtain a nylon has been known for many years.

In U.S. Pat. No. 3,018,273 a process for the in situ polymerization of caprolactam is described. An organomagnesium compound is used as an initiator and an N,N diacyl compound is used as promoter (or activator).

British Pat. No. 1,067,153 describes a process for preparing nylon-block-copolymers by anionically polymerizing caprolactam in the presence of various activators suitable for preparing nylon 6 polymers. Preparation of nylon block copolymers using an isocyanate terminated polypropylene glycol and a potassium based catalyst is described. A nylon block copolymer containing at least one polyether block is thereby formed.

In U.S. Pat. Nos. 3,862,262, 4,031,164, 4,034,015 and 4,223,112 various aspects of the preparation of nylon block copolymers from caprolactam in the presence of an acyllactam activator are described.

U.S. Pat. Nos. 4,031,164 and 4,223,112 describe lactam-polyol-polyacyl-lactam-block terpolymers having a specified ratio of the various components. More particularly, the former patent discloses the use of 18 to 90% by weight of polymer blocks in the terpolymer.

U.S. Pat. No. 3,862,262 describes lactam-polyol-acyl-polylactam block-terpolymers.

U.S. Pat. No. 4,034,015 is directed to lactam-polyol-polyacyl-lactam or lactam-polyol-acyl-polylactam block terpolymers having at least about 5% ester end group termination.

Reissue Patent 30,371 describes preparing polyester-polyamide compounds by condensation of an alcohol and acyllactams in the presence of at least one Group IA, IIA, IIB, and IIIA metal or metal compound.

U.S. Pat. No. 3,925,325 describes the preparation of monomeric and/or polymeric compounds such as esters, polyesters, ester amides, and polyester-polyamides by conducting the the reaction of an imide and an alcohol in the presence of an organoaluminium, imide-alcohol condensation catalyst.

U.S. Pat. No. 3,965,075 describes using an amide or a Group IVA, IB, IVB, VB, VIB, or VIII organometal compound for this condensation.

In European Patent application No. 67693, now laid open to public inspection, acid halide materials and acyllactam functional materials are described as useful in the preparation of nylon block copolymers selected from the group consisting of those having the formula

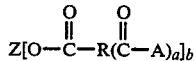

and

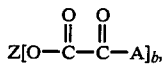

wherein
A is X or Q,
X is halogen,

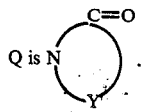

with

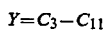

alkylene;
a is an integer equal to 1, 2 or 3;
b is an integer equal to or greater than 2;
R is a di- or polyvalent group selected from hydrocarbon groups and hydrocarbon groups containing ether linkages; and
Z is a segment of:

(1) a polyester having a minimum molecular weight of 2,000,
(2) a polyester containing polyester segments having minimum molecular weights of about 2000,
(3) a segment of a hydrocarbon or
(4) a polysiloxane.

European patent application No. 67,695, now laid open to public inspection, describes a process for preparing a nylon block copolymer by reactively contacting a lactam monomer, a basic lactam polymerization catalyst and the acyllactam functional material described in European patent application No. 67,693.

European patent application No. 67,694, now laid open for public inspection, is directed to acid halide and acyllactam functional materials and to a process for the preparation of nylon block copolymers therewith. The acid halide or acyllactam functional materials are selected from the group defined by a complex formula.

Sibal et al, Designing Nylon 6 Polymerization Systems for RIM', apparently presented in part at the 2nd International Conference on Reactive Polymer Processing, Pittsburgh, Pa., in November 1982, describes preparing various initiators for anionically polymerizing lactams including a polymeric initiator. This initiator is prepared by reacting hexamethylene diisocyanate (HDI) with a polypropylene oxide diol having an average molecular weight of 2000, by slow addition of the polyol (1 mole) to two moles of HDI. The resulting product was reacted with anhydrous lactam at 80° C. No mechanical properties data are reported on the final product. Indeed, further work is said to be required to even begin exploring the processability and properties of the products. This paper also reports that reaction ratios and other process governing parameters are not known and further work is required.

U.S. Pat. No. 4,400,490 describes the anionic polymerization of a lactam with an epoxy-compound in the presence of a basic catalyst and a promoter. The epoxy compound can be the reaction product of a polymeric polyol and an epoxy compound.

U.S. Pat. No. 3,793,399 describes the use of a polyol, soluble in molten caprolactam, for improving the impact resistance of polycaprolactam. An organic nitrogen compound is used as a promoter in the polymerization.

The use of etherified polyols in the anionic polymerization of caprolactam is described in U.S. Pat. No. 3,770,689.

It has been suggested to prepare an activator for the polymerization of lactam by reacting a polyol (such as a polymeric diol, triol or tetrol) and a lactam terminated polyisocyanate in the presence of a lactam polymerization catalyst of a Lewis acid.

Presently, nylon 6 block copolymers may be candidates for structural exteriorly exposed panels. However, drawbacks weighing against the adaptability of nylon to the RIM process include the high moisture absorption rate of the product which could adversely affect dimensional stability between demolding and coating operations. Thus, mechanical properties such as impact strength—especially for the glass fiber filled products—, water absorption, and flexural modulus must be improved. Otherwise, there will be obstacles to production on a commercial scale.

Another disadvantages of the RIM process for the preparation of nylon block copolymers is that it is not possible to determine the molecular weight (or degree of polymerization) of the nylon blocks independently from the amount of rubber phase used and the molecular weight thereof.

In the anionic polymerization of a lactam, using a polymeric activator, only two degrees of freedom exist, viz. when the molecular weight of the initiator and the amount thereof (=rubber content) have been fixed, the degree of polymerization is also fixed and vice versa. It would be very advantageous if the amount of rubber phase incorporated in the system could be independent of the molecular weight of the nylon block in the nylon block copolymer.

The improvement of the properties mentioned herein above, and other objects are achieved by the present invention.

DESCRIPTION OF THE INVENTION

The present invention provides a process for preparing objects by reacting in a mold, in the presence of each other, both polyamide forming compounds and polyurethane forming compounds. The polyamide forming compounds at least comprise an anionic polymerization catalyst, an activator and a lactam. The polyurethane forming compounds at least comprise a polyol, a polyisocyanate and a polyurethane catalyst.

More particularly, the present invention provides a reaction injection molding process including the following combination of steps: introducing a mixture obtained from of substantially stable reactant streams into a mold, the mixture, in the aggregate, containing polyamide polymer forming compounds and polyurethane polymer forming compounds. The polyamide polymer forming compounds comprise a lactam, an anionic polymerization catalyst and a polymerization activator. The polyurethane polymer forming compounds comprise a polyol, a polyisocyanate, and a polyurethane polymerization catalyst. The polyamide polymer forming compounds and the polyurethane forming compounds reacting to form respectively polyamide and polyurethane polymers in the mold to thereby form a reaction injection molded product composed of these polymers. The thus formed product is recovered from the mold. The stable reactant streams separately contain, prior to admixture, some of the compounds introduced into the mold. In the aggregate the streams contain all of the reactants required to produce the products.

In the present process both a polyamide and a polyurethane are formed. Due to the approximately simultaneous reaction, these polymers are intermingled at molecular scale thereby resulting in a polymer alloy.

It is believed, based upon the present understanding of the invention, that the polyamide and polyurethane polymers are formed independently of each other by different mechanisms, whereby the formation of covalent bonds between the polymer systems is substantially prevented. However, occasional grafts between the polyamide polymer and the polyurethane polymer may occur.

If specific process reaction conditions are employed, then an interpenetrating polymer network can be formed.

Interpenetrating polymer networks (IPN's) exhibit varying degrees of phase separation depending principally on the compatibility of the polymers. With highly incompatible polymers, the thermodynamic forces leading to phase separation are so powerful that separation occurs substantially depite countervailing kinetic factors. In these cases only small gains in phase mixing occur. In cases where the polymers are more compatible, phase separation can be almost completely circumvented. However, complete compatibility is not necessary to achieve complete phase mixing, since the permanent entanglements (catenation) can effectively prevent phase separation. With intermediate situations of compatibility, intermediate and complex phase behavior results. Thus, IPN's with dispersed phase domains ranging from a few micrometers incompatible to a few tens nanometers (intermediate), finally to those with no resolvable domain structure (complete mixing) have been reported.

IPN's represent a special example of topological isomerism in macromolecules, i.e. different ways of imbedding these molecules in three-dimensional space. Some permanent entanglements between the different crosslinked networks are inevitable in any sufficiently intimate mixture of the crosslinked networks. These represent examples of catenation in polymer systems.

Combining varied chemical types of polymeric networks in different compositions, frequently resulting in controlled but different morphologies, can produce IPN's with synergistic behaviour. For example, if one polymer is glassy and the other is elastomeric at room temperature, then either a reinforced rubber or a high impact plastic depending on which phase is continous can be obtained. Known interpenetrating polymeric networks are described in U.S. Pat. No. 4,302,553 and in Frisch et al, Recent Advances in Interpenetrating Polymer Networks, Poly. Eng. Sci., Vol. 22, pp. 1143–1152 (Dec. 1982).

In producing such networks, little or no phase separation occurs during the reaction in the mold. This can be accomplished by a suitable choice of the various compounds such as, for example, choosing both polyamide and polyurethane forming compounds which are compatible with each other. In that case it can also be important that the polyamide and the polyurethane are compatible with each other. Another approach entails controlling the compounds such that the reaction rates of the polyuretahne and/or the polyamide reaction are so fast that little or no phase separation occurs.

Depending on the compounds used, guidelines will be discussed in greater detail hereinbelow, various kinds of polymer alloys may be obtained. For instance, when both the polyamide and the polyurethane are cross-linked the resulting product will comprise two intermingled (interpenetrated) cross-linked polymeric structures (IPN). Whereas, if only one of the polyamide or polyurethane polymers is cross-linked while the other is linear or branched then the product will comprise one network in which the other non-cross-linked polymer is distributed on a molecular scale (pseudo IPN). Still further, if the polyamide polymers and the polyurethane polymers are both linear or branched, substantially without cross-linking, a polymeric blend is obtained; the blend is a polymer mixture on a molecular scale which can also provide advantageous properties.

A polymer alloy product having one cross-linked polymer, i.e. one polymer network, may be considered as a pseudo interpenetrating network (pseudo IPN) and, if the other polymer(s) is also cross-linked it is considered a full interpenetrating polymer network (IPN or full IPN).

The weight ratio of the polyamide forming compounds on the one hand and the polyurethane forming compounds on the other, and consequently the polyamide-polyurethane weight ratio in the final product, depends on the properties which are to be obtained. The properties relate to desired end uses of the product, such as, for instance, automobile body panels.

As the polyamide is mainly a stiff, i.e. relatively inflexible, polymer whereas polyurethane is an elastomeric product, the present process provides means whereby products having a wide range of properties can be obtained. The properties may range from a reinforced rubber at a polyurethane/polyamide weight ratio of, for instance, 95/5 to a high impact plastic at a polyurethane to polyamide weight ratio of, for instance 5/95.

In general, preferred weight ratios for high impact plastics of the present invention are from 5 to 40 parts by weight of polyurethane (polyurethane forming compounds) and from 60 to 95 parts by weight of polyamide (polyamide forming compounds). For reinforced rubbers the ratios are, for example, reversed.

In addition to the amounts of polyamide and polyurethane, other non-interfering additives may be present in amounts of up to 100 parts by weight per 100 parts of polyamide and polyurethane. These additives will be discussed in more detail in relation to the reaction injection molding process.

It should be recognized that while the polyamide and polyurethane are hereinafter described singly in more detail, the process produces a product wherein such polymers are intermingled on a molecular level.

THE POLYAMIDE

The polyamide obtained in accordance with the present process in the final polymer alloy product is produced by the anionic polymerization of a lactam. The lactam can be any one of the $C_4$–$C_{14}$ lactams, such as 2-pyrrolidone, 2-piperidone, caprolactam and lauryllactam. Mixtures of two or more lactams can be used. Preferably caprolactam is employed to advantageously yield a product having superior physical properties. Also the polymerization rate of the preferred lactam is quite rapid. Advantageously, the polyamide forming compounds employed anionically polymerize to yield nylon 6 homopolymers, nylon 6 random copolymers, or nylon 6 block copolymers.

The anionic polymerization of the lactam occurs in the presence of a polymerization catalyst and an activator. First, the anionic polymerization catalyst can be any one of the known catalysts such as sodium lactamate, potassium lactamate or any one of the Grignard compounds such as bromomagnesium lactamate. Mixtures of catalysts may be employed.

Second, numerous activators for the polymerization of lactam can be used in the present invention. The activator, or promoter as it is sometimes called, can advantageously comprise one or more compounds chosen from the group of lactam terminated isocyanates also comprising lactam terminated polyurethanes, and acyl lactam compounds.

As already indicated, the specific reactive compounds employed in the present process determine the type of polyamide obtained as well as its characteristics. More particularly, linear or branched polyamides are obtained when using acyl lactam promoters especially if combined with a magnesium-type of catalyst. The difference between linear and branched polyamides is determined by the functionality of the activator because the polyamide chains are chemically bound to the activator compound at the locus of the activator group.

A lactam terminated isocyanate activator may result in a substantially non-linear polyamide. A lactam terminated isocyanate activator used in combination with a alkali-metal-type of catalyst may lead to cross-linking in the polyamide. For example, using an activator having a functionality of at least 3 may result in the substantial amount of cross-linking resulting in a polyamide network. Suitable activators include, for instance, a lactam terminated diisocyanate, and an acyl lactam compound of low molecular weight, i.e. lower than about 500.

In another embodiment, the activator is the reaction product of an organic hydroxy compound, such as a polyfunctional hydroxy compound (polyol) having at least two hydroxyl groups per molecule, and a compound providing activator groups. Generally, the known polyols may be employed. Advantageously, the polyol is a polyetherpolyol, polyesterpolyol, polybutadienepolyol, siloxane containing polyol and/or a so-called 'polymeric' polyol. The 'polymeric' polyols as defined herein include graft polymers obtained by grafting one or more ethylenically unsaturated monomers onto a polyether polyol as well as the polyurea dispersions in polyols (PUD). These polyurea dispersions can be obtained by dissolving a diamine or hydrazine together with a diisocyanate in stoichiometric amounts in a polyol and reacting the dissolved compounds to form a polyurea compound dispersed in the polyol.

The amount of the ethylenically unsaturated monomer grafted on the polyol ranges from 10-35% by weight on the final grafted product ('polymeric' polyol). Examples of suitable grafting monomers are especially acrylonitrile or a mixture of styrene and acrylontrile. A suitable product of this type is known as Niax 31-28. Likewise, the amount of polyurea dispersed in the polyol is from 10-35% by weight of the total dispersion.

Advantageously these 'polymeric' polyols may be employed to yield a product (nylon block copolymer) having a higher flexural modulus while, surprisingly, avoiding a decrease in impact resistance. Other examples of polyols that can advantageously be used are the poly(oxyethylene) and poly(oxypropylene) adducts or blends thereof of diols, triols and tetrols, polyols with polyether segments containing polyesters, polyester polyamide-polyols and polylactones. Polyols obtained by ethoxylating and/or propoxylating ethylene diamine, glucose, fructose, saccharose or trimethylolproponae an also suitable.

The polyols described hereinabove are mainly of a relatively high molecular weight. Advantageously, the equivalent weight of these polyols is at least 300, more particularly the equivalent weight ranges between about 1000 and about 2500. In these ranges optimal properties of the final object are obtained, viz. a high impact-strength combined with a high flexural modulus without problems in preparing the activator, due to high viscosity.

It is to be understood that any molecular weight, or equivalent weight, referred to herein are numerical average weights. Furthermore, the term equivalent weight of a polyol is understood to mean the numerical average weight of the polyol per hydroxyl group, i.e. the molecular weight divided by the functionality.

The compound providing activator groups is advantageously a lactam terminated diisocyanate which includes lactam terminated polyurethane, a diacyl lactam compound or diacyl halide compound.

The lactam terminated diisocyanate can be prepared by reacting lactam such as caprolactam, and a diisocyanate, such as hexamethylene diisocynate, isophorone diisocyanate, and toluene diisocyanate methylene bis(-phenyl-isocyanate) MDI and hydrogenated MDI, or modified MDI such as carbodiimide modified MDI, (Isonate 143L, Upjohn Company or Mondur PF, Mobay Chemical Corporation) and diol extended prepolymers of MDI (Isonate 181, or 191). Other possible isocyanates are XDI, $H_6XDI$, and hydrogenated TDI.

The diacyl lactam compound, for example, includes terephtaloylbiscaprolactam, adipoylbiscaprolactam, oxaloylbiscaprolactam, isophtaloylbiscaprolactam or mixtures of two or more of these compounds.

The suitable diacylhalide compounds include the halides corresponding to the above diacyllactam compounds. Advantageously, the halide compounds is a diacylchloride corresponding to the above diacyllactam. In the case of the diacylhalide the reaction with the polyol is a simple ester-forming reaction. The reaction is preferably conducted in the presence of a basic compound which reacts which the hydrogen halide formed in this reaction, or the hydrogen halide can be driven off by heat. This reaction product is thereafter reacted with lactam to yield an activator for the lactam polymerization.

The reaction of the lactam terminated isocyanate or the acyllactam compound and the polyol requires the presence of at least one catalyst. In general, it can be stated that suitable catalysts are the metals and metal compounds of Group IA as well as the Lewis acids. Examples of catalysts which can advantageously be used are sodium, potassium, magnesium, and compounds thereof. It is also possible to use compounds of copper, tin, titanium, vanadium, chromium, manganese, iron, cobalt, nikkel, calcium, zinc, and barium. Suitable compounds are the acetylacetonates, chlorides, bromides, lactamates, alcoholates such as methoxides and ethoxides and carboxylates such as acetates. Catalysts include, for example, sodium-lactamate, potassium-lactamate, magnesium chloride, magnesium bromide, Grignard compounds, Cu (II) acetylacetonate, Sn (II) chloride, Sn (II) ethoxide, Sn (II) acetylacetonate, Ti (III) chloride, Ti (III) acetylacetonate, Ti (III) ethoxide, V (III) ethoxide, V (III) acetylacetonate, V (III) chloride, Cr (III) chloride, Cr (III) acetylacetonate, Mn (II) chloride, MN (II) acetylacetonate, Fe (III) chloride, Fe (III) acetylacetonate, Co (III) chloride, Co (II) acetylacetonate, nickelacetylacetonate, nikkelchloride, Cr (III) acetylacetonate, calcium ethoxide, calcium acetylacetonate, bariumlactamate, bariumchloride, bariumacetylacetonate, and the chlorides, lactamates and acetylacetonates of zinc, calcium and aluminum.

The molar ratio of the polyol and the compound providing initiator groups depends on the functionality of these compounds as well as on the required amount of available reactive actuator groups present in the activator. For example, by reacting one mole of a diol with two moles of a diacyl compound then, on average, every hydroxyl group will have reacted with one diacyl compound. Using 1.5 moles of a diacyl compound, a product is obtained wherein, on average, two diols, are coupled to each other by one diacyl molecule (diacyl-diol-diacyl-diol-diacyl).

Isocyanate-terminated urethane prepolymers can also be used for preparing lactam-terminated compounds which are to be used as activator for the anionic polymerization of lactam. The lactam terminated compounds are prepared by reaction of the isocyanate-terminated prepolymer with lactam at an isocyanate/lactam equivalent ratio of about 1:1. The isocyanate terminated-prepolymers are prepared by the reaction of a diisocyanate with a diol or triol of polyoxyalkylene ether glycol or of polyether diol.

Using an activator, prepared, in part, from a polyol, the polyamide in the polymer alloy product is a nylon block copolymer having at least one polyol-block and, depending on the number of hydroxyl groups in the polyol, two or more nylon blocks.

The polyamide prepared in accordance with the above description, if use is made of a two functional compound yielding activator groups, is a compound of the formula

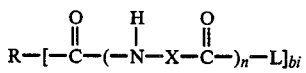

wherein

X is a substituted or unsubstituted alkylene-group having 3-12 carbon atoms, $b_i$ is an integer $\geq 2$, n is the degree of polymerization for each nylon block, and is preferably $\geq 10$

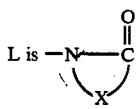

and R has the following configuration

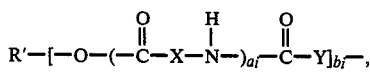

wherein R' is the residual of a polyol, such as
polyether polyol
polybutadiene polyol
polyester polyol containing one or more polyether blocks
grafted polyether polyol,
$a_i$ has a value $\geq 0$, and
Y is

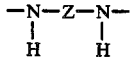

a divalent hydrocarbon group, or
an ether compound,
Z being the divalent hydrocarbon part of a diisocyanate.

The value of $b_i$ corresponds to the functionality of the hydroxyl compound (usually the polyol) used. If a pure compound is used $b_i$ is an integer. However, if a mixture of two or more different hydroxy compounds is used then, the value of $b_i$ is the mean value of the functionality. Thus $b_i$ is not necessarily an integer.

For example if a mixture of 25 mole % of a diol, and 75 mole % of a tetrol of the same molecular weight is used, the value of $b_i$ will be 3.5.

Depending on the method used to prepare the activator compound, $a_i$ can have a specific value. If a lactam compound is used, or if molten lactam is used as a solvent, it is possible that some lactam blocks are incorporated in the activator. In that case $a_i$ is larger than zero.

Of course it is possible that if $b_i$ is larger than one, that in one nylon block copolymer, for each group $a_i$ has another value.

The Sibal et al method yields a polyamide having $a_i$=zero since no lactam is present during the reaction of polyol and diisocyanate. A like result is obtained using the diacyl-halide compounds described in, for instance, the European patent application Nos. 67693, 67694 and 67695.

If however a diacyl lactam compound is prepared from a diacyl lactam and a polyol, as described in U.S. Pat. No. 3,862,262, a part of the lactam will be incorporated in the activator, whereas another part will split off. The value of $a_i$ will then be between 0 and 1.

Anionic lactam polymerization essentially requires anhydrous conditions. The presence of water can inactivate the catalyst. These anhydrous conditions are obtained by distilling off any water present together with some lactam, as is well known in the art. Of course, this is quite distinct from hydrolytically polymerizing lactam wherein water initiates the reaction. The hydrolytic reaction process, however, includes unduly long (several hours) reaction/process times.

The ratios of the various polyamide forming components depend on their functionality and on the properties which are required in the end product, such as impact strength, flexural modulus and heat distortion temperature.

Generally in the case of a nylon block copolymer based upon a rubbery polyol, the amount of the polyol ranges from 5-35 wt. %, and more particularly the amount of the polyol ranges from 5 to 25 wt. % with respect to the total amount of polyurethane and polyamide.

With respect to the amount of lactam at least about 1.2 equivalent % of activator groups must be present as otherwise the reaction rate becomes too low.

The amount of catalyst can vary within wide ranges, such as from as low as 0.05 mole % to as high as 10 mole % w.r.t. lactam. An advantageous range is from about 0.5 to 2.0 mole %.

THE POLYURETHANE

The polyurethane forming compounds comprise at least one polyol, with or without a chain extender consisting of diols, alkanol amines and diamines, at least one polyisocyanate and at least one polyurethane catalyst.

As indicated hereinbefore, controlling the combination of reactants determines the type of polyurethane obtained in the final product in accordance with the present invention. For example, controllably selectively correlating reactants enables the practitioner to obtain a linear or a cross-linked product (network).

A cross-linked polyurethane may be obtained with various combinations of polyisocyanates and polyols. For example, such combinations could include a diisocyanate and three or higher functional polyol, an NCO terminated prepolymer (from diisocyanate and diol) and a three or higher OH-functional polyol, an NCO terminated prepolymer (as above) and diamine (to obtain a urea or biuret type of product), a triisocyanate and two or higher functional polyol.

A linear polyurethane can be obtained by reacting equivalent amounts of diisocyanate and a difunctional polyol.

At least part of the hydroxyl groups required for the polyurethane reaction are advantageously provided by polyols having molecular weights of at least 300 and, preferably, range between 1,000 and 2,500 and containing 2 to 4 hydroxyl groups per molecule. Such polyols are at least 50 wt. % in the polyurethane as otherwise the mechanical properties are insufficient (to low impact strength).

In a preferred embodiment, the polyol comprises one or more polyols of the group of polyoxyalkene glycols contain $C_2$ to $C_4$ oxyalkene units, addition products of a $C_2$ to $C_3$ alkene oxide to a trihydroxy compound, polylactone-diols and triols derived from $C_5$ to $C_{12}$ lactones, hydroxyl terminated polyesters, hydroxyl group containing polyacrylates and hydroxyl group containing graft polymers containing chains based on acrylonitrile or mixtures of acrylonitrile and styrene.

The suitable polyols include the polyoxyalkene glycols containing $C_2$ to $C_4$ oxyalkylene units, e.g. polyethylene glycol, polypropylene glycol, polytetramethylene glycol and random or block copolymers of ethylene oxide and propylene oxide, polylactone polyols derived from a $C_5$ to $C_{12}$ lactone, as may be obtained by polymerizing caprolactone, valerolactone or oenantholactone in the presence of a polyfunctional initiator, dihydroxyl-terminated polyesters, polycarbonate-diols, polyhydroxyl group containing polyacrylates, hydroxyl group-containing polybutadiene, hydroxyl group-containing graft polymers containing polymer chains based on e.g. acrylonitrile, styrene or combinations thereof, and addition products of ethylene oxide or propylene oxide to a polyfunctional, and preferably trifunctional, hydroxyl compound, for example glycerol or trimethylolpropane. Polyesters which may be used as polyols may be obtained by reacting one or more $C_4$ to $C_{12}$ aliphatic and/or aromatic carboxcylic acids, e.g. adipic acid, azelaic acid, phthalic acid or terephtalic acid, with one or more $C_2$ to $C_{12}$ aliphatic and/or cycloaliphatic diols, e.g. ethylene glycol, diethylene glycol, or 1,4-(hydroxymethyl)-cyclohexane, in proportions to provide dihydroxyl terminated polyesters. The use of the polyurea dispersion described above is relation to the activator for the lactam polymerization is also possible.

In an embodiment of the invention a low molecular weight diol that can act as chain extender is used in addition to the polymeric polyol, i.e. dihydroxy compounds having a molecular weight of from 62 up to and including 200. Examples are aliphatic unbranched diols e.g. ethylene glycol, 1,4-butanediol and 1,6-hexanediol, branched diols e.g. 1,2-propyleneglycol and 2,2-dimethyl-1,4-butanediol, low molecular weight polyalkylene glycols e.g. diethylene glycol, triethylene glycol, or cycloaliphatic diols such as 1,4-(hydroxymethyl)-cyclohexane or bishydroxymethyl-hydroquinone. Advantageously the low molecular weight diol used is an aliphatic diol with 2–6 carbon atoms, such as 1,4 butanediol. The amount of low molecular weight diols is less than 50 wt. % of the polyols used, more in particular it is between 10 and 30 wt. %.

The polyisocyanates used in the process of the invention include aromatic, aliphatic, araliphatic or cycloaliphatic diisocyanates in pure or crude form, e.g. toluene diisocyantes, 4,4'diphenylmethane diisocyanate (MDI), polymethylene polyphenylisocyanates, isophorone diisocyanate (IPDI), hexamethylene diisocyanate and xylylene diisocyanate (XDI) as well as modified MDI, for example carbodiimide modified, hydrogenated aromatic diisocyanates like hydrogenated MDI, TDI or XDI. Also, siutable are the polyfunctional isocyanates obtained by catalytic trimerisation of a diisocyanate (e.g.

trimer derived from IPDI) or an isocyanate-terminated polyether triol obtained by the reaction of one mole of a polyethertriol with at least three moles of a diisocyanate, e.g. Desmodur N (a trade mark of Bayer A.G.). Adducts of diisocyanates e.g., TDI, MDI or HDI with a triol, e.g. trimethylolpropane can also be used.

The ratio of terminal isocyanate groups in the polyisocyanate to the amount of hydroxyl groups is 1.00:1 to 1.05:1.

One or more catalysts accelerating the isocyanate reaction are usually used such as, for example, the tertiary amines, e.g. triethylene diamine, triethyl amine, bis(dimethylamino ethyl) ether and tin containing compounds, such as tin salts of carboxylic acids e.g. dibutyltin diacetate, dibutyltindilaurate or stannous octoate.

THE REACTION INJECTION MOLDING PROCESS

In addition, the RIM-process requires consideration of various parameters.

As is conventional in a RIM-process at least two substantially stable reactant streams each containing a portion of the components required to obtain the polymer alloy product, in the aggregate containing all the product precursor compounds are mixed in a suitable mixing device, whereafter the resulting mixture containing all the necessary components is introduced into the mold.

It is essential that the reactant streams are substantially stable prior to mixing, which means that no or almost no prepolymerization or other undesired reactions occur in these streams. Thus, the various polyurethane polymer and polyamide polymer forming compounds are divided into at least two reactant streams. Each stream will not contain all of the respective polyamide polymer and polyurethane polymer forming compounds in order to ensure that substantially no polymerization occurs prior to the mixing of the streams and introducing the mixture into the mold.

A suitable combination of components for one stream comprises the polyurethane catalyst, the anionic polymerization catalyst and the polyol. The other stream contains the activator and the isocyanate. Preferably lactam is used as solvent.

Possible undesired reactions could occur if the polyisocyanate and the polyol were combined in one stream. As will be shown in one of the examples, it is impossible to use a solution of polyisocyanate in lactam, although isocyanate is known to react with lactam. However, it is not preferred to keep such a solution too long at a relatively high temperature. In view thereof, the polyisocyanate is preferably introduced into the mold as a separate reactant stream or into one of the other reactant streams shortly before the mixing thereof with the other reactant stream or streams.

The volume ratio of the various reactant streams is not critical. The most important factor which governs this ratio is the efficiency of the mixing. Preferably the volume ratio between the various streams does not exceed 4, and more particularly the volume ratio does not exceed 2. Most advantageously, the volume ratio(s) of the reactant streams is about one.

It is further possible to conduct the polymerization reaction in the presence of one or more additives conventionally incorporated in either nylon block copolymer and/or polyurethane components. Such additives include plasticizers, fillers and reinforcing agents such as glass fibers, dyes, pigments, stabilizers, antioxidants, foaming agents, internal mold release agents and the like. These fillers and reinforcing agents may be present in amounts of up to about 50 wt. % of the product. More particularly, the amount ranges to between about 1 and about 25 wt. %, depending on the properties required.

Suitable fillers and reinforcing agents comprise milled or chopped glass fibers such as the milled 1/16", or the chopped ⅛" silane treated glass fibers, but also products like wollastonite, flaked mica and the like. Advantageously a combination of a fiber and a non-fiber product such as a combination of 1/16" milled silane treated glass fiber and mica or wollastonite is employed, in a ratio between about 30 to about 70 and about 70 to about 30 parts by weight. An important advantage of such combination is that isotropic properties in the product are enhanced. This means that unlike with glass fibers alone, the properties of the final object are independent of the direction in which they are measured.

The use of glass-fiber results in decreased thermal expansion, lower shrinkage, and an increase of flexural modulus. A negative aspect thereof is that the impact strength decreases. The amount of glass fibers that can be introduced into the product with the presently available machinery, has an upper limit which is determined by the fact that the dispersion of glass-fibers in lactam has to be pumped into a mold. With 1/16" milled glass-fibers this upper limit is about 25 wt. % whereas generally only a lower amount of chopped ⅛" glass fibers can be used.

The presence of additives in all reactant streams is not required. For example, the pigment or antioxidant may be present only in one stream. The very efficient mixing which occurs in a RIM process will ensure that any additive(s) is (are) distributed substantially homogeneously throughout the final product. However, to obtain a high proportion of glass fibers or other fillers in the final product, the quantity of fibers is divided among the reactant streams.

In the RIM process the reaction injection molded product is prepared by mixing the at least two reactant streams, each stream containing a portion of the components required to obtain the polymer alloy product, in a mixing head, and introducing the resulting mixture into a, preferably heated, mold.

The temperature at which the reactant streams are kept prior to mixing with each other is not critical. The temperature should be above the melting point of the lactam since preferably the lactam is employed as the solvent for the other reactants. Nonetheless, the temperature is maintained to avoid reactant degradation or reactant volatility at atmospheric pressure. This avoids pressurized equipment. For example, if a caprolactam solvent is employed, a suitable temperature range is from about 80° C. to about 100° C.

In case a reinforced rubber is prepared, it is not necessary to employ the lactam as the only solvent. It is also possible to have reactant streams using different solvents such as liquid polyols, or even to use these polyols as the only solvent.

In view of the mixing procedure it is preferred that the various reactant streams have approximately the same temperature prior to mixing. In that case undesired effects due to the mixing of colder and warmer streams are avoided. Unlike polyurethane RIM this requires that the lines through which the reactant streams flow to the mixing device and the mold are at least insulated, or more advantageously, controllably heated by steam, oil, or electricity.

After mixing all the reactant streams the aggregate mixture is introduced into a heated mold which is kept at a temperature favoring a rapid polymerization rate. Since the polyurethane reaction readily occurs at room temperature, the mold temperature is mainly governed by the lactam polymerization. Advantageously the temperature of the mold is above the melting point of the lactam solutions, but below the melting point of the resulting product. Temperatures advantageously range from about 120° to about 175° C.

The residence time in the mold depend on the reaction rate of the various components. It can advantageously be between 10 seconds and 10 minutes.

The pressure required for introducing the solution into the mold is not critical. One of the major advantages of the reaction-injection-moulding technique is the low viscosity of the components, compared to thermoplastic polymers, thus requiring low injection pressures.

The following non-limiting examples illustrate the present invention. In Examples 1–3 and comparative examples A, B and C the preparation and properties of some (pseudo) IPN's having varying degrees of rubber phase content are described, and compared with products not according to this invention. In examples 4 and 5 the influence of the type of polyisocyanate on the reaction rate is given, whereas comparative example D shows that the presence of a separate activator for the lactam polymerization is essential to obtain the polymerization of lactam, which confirms that the isocyanate used does not react with a lactam under the reaction conditions such as temperature and the time to form an activator.

EXAMPLES 1–3 AND COMPARATIVE EXAMPLES A–C

In 25 g of anhydrous caprolactam 5 g of an carbamoyl-lactam activator and 2 g of Pluracol 220 (primary hydroxyl groups containing polyether triol with equivalent weight of 2078) were dissolved at 90° C. The activator was prepared by first reacting HDI and Pluracol P.380 a primary hydroxyl groups containing polyether-triol with equivalent weight of 2244 in an equivalent ratio of 2 to 1. The resulting isocyanate terminated polyurethane was reacted with caprolactam to yield a trifunctional activator.

In a second portion of 25 g of anhydrous caprolactam 10 meq of bromo magnesium lactamate dissolved in caprolactam (10 g combined weight) and two drops of T9 (Sn II octoate) were dissolved at 90° C. The total amount of caprolactam in the aggregate streams amounted to 57.9 grams.

The two caprolactam solutions and 0.42 g of Isonate 143 L (liquid MDI) were mixed at 120° C. The resulting mixture was introduced into a mold which was kept at 130° C. The product recovered from the mold possessed the mechanical properties given in Example 1 in Table I.

Two other experiments were performed as described above wherein the total amount of the rubber phase (polyether plus polyurethane) was increased by increasing the amounts of polyurethane. The properties thereof are also given in Example 2 and 3 in Table I.

For comparison three nylon block copolyers were prepared using only the polyamide forming components, without the polyurethane forming compounds.

The amounts of the rubber phase (only polyether) in these copolymers are somewhat higher than those contained in the products of Examples 1-3.

The results are presented in Table II. A comparison of the two tables clearly shows that the invention provides for markedly superior products even at relatively low levels of rubber phase.

the test tube in an oil bath of 130° C. for 5 minutes, the reactant mixture was still clear (no cloud point). Thereafter 2.1 g of potassium lactamate in caprolactam was added. No polymerization was observed within 15 minutes.

This confirms that the HDI does not react with the caprolactam to give a caprolactam capped HDI activa-

TABLE I

| | | Before Water Absorption | | | After Water Absorption (for one week) | | | | |
|---|---|---|---|---|---|---|---|---|---|
| Ex. | Rubber Phase wt. % | Tensile Strength (kpsi/MPa) | Elongation (%) | Izod (J/m) | Tensile Strength (kpsi/MPa) | 100% (kpsi/MPa) | Elongation (%) | Tear Strength (pli/kN/m) | Izod (J/m) |
| 1 | 12.4 | 9.81 67.6 | 36.7 | 89 | 4.9 33.8 | 4.5 30.6 | 220 | 880 154 | 221 |
| 2 | 18.5 | 9.61 66.3 | 30.0 | 111 | 4.7 32.4 | 3.85 26.20 | 230 | 801 140 | 256 |
| 3 | 22.5 | 7.15 49.3 | 98 | 84 | 4.7 32.4 | 3.57 24.30 | 338 | 853 149 | 400 |

TABLE II

| | | Before Water Absorption | | | After Water Absorption (for one week) | | | |
|---|---|---|---|---|---|---|---|---|
| Ex. | Rubber Phase wt. % | T.S.* (kpsi/MPa) | 100% modulus kpsi/Mpa | % Elongation | T.S.* (kpsi/MPa) | 100% Modulus (kpsi/Mpa) | % Elongation | Tear Strength (pli/kN/m) |
| A | 44.1 | 1.6 11.0 | 0.8 5.7 | 321 | 1.5 10.6 | 1.0 7.2 | 433 | 585 102.0 |
| B | 29.4 | 1.5 10.3 | 1.4 9.9 | 120 | 1.3 8.6 | — | 76 | 459 80 |
| C | 14.8 | 5.3 36.8 | — | 33 | 3.0 21.0 | — | 84 | 131 23 |

*Tensile Strength

EXAMPLE 4

In the same way as described for examples 1-3, two solutions, 'A' and 'B', in caprolactam were prepared respectively having the compositions presented in TABLE A.

TABLE A

| A | 8.3 g | activator[x, xx] |
|---|---|---|
| | 3 g | Pluracol TPE 4542 (polyether triol, eq. wt. 1567) |
| | 16 g | caprolactam |
| B | 21.1 g | potassium lactamate[xx] |
| | 16 g | caprolactam |
| | 2 | drops of $T_{12}$ (dibutyltin dilaurate) |

[x]prepared by reacting a polypropylene-oxide triol and hexamethylene, carbamoyl biscaprolactam in using sodium lactamate as catalyst.
[xx]contains caprolactam; amounts thereof in the aggreate mixture was 34.7 grams.

Both solutions were mixed together with 0.3 g Isonate 143 l at 90° C. The resulting mixture was introduced into a mold at 130° C. The mixture became viscous after 5 sec, reached its cloud point after 80 sec and was completely copolymerized after 6 minutes, 15 seconds.

EXAMPLE 5

Using the process described in Example 4 with the exception that 0.16 g of hexamethylane diisocyanate (HDI) was used instead of Isonate 143 L, the mixture became viscous after 5 seconds, reached its cloud point after 55 seconds and was completely polymerized after 120 seconds.

The comparison of Examples 4 and 5 clearly shows that the use of HDI as the polyisocyanate in the polyurethane forming compounds is to be preferred.

EXAMPLE D

To a test-tube containing 3 g. of Pluracol TPE 4542, 32 g of caprolactam and two drops of $T_{12}$ at a temperature of 90° C., 0.16 g HDI was added. After immersing tor, at least not under this reaction conditions.

What is claimed is:

1. A reaction injection molding process comprising: introducing a mixture substantially obtained from stable reactant streams into a mold, said mixture, in the aggregate, containing polyamide polymer forming compounds and polyurethane polymer forming compounds, said polyamide polymer forming compounds including lactam, an anionic polymerization catalyst and a polymerization activator, said polyurethane polymer forming compounds including a polyol, a polyisocyanate and a polyurethane polymerization catalyst, said polyamide polymer forming compounds and said polyurethane forming compounds reacting to respectively form polyamide and polyurethane polymers in said mold thereby yielding a reaction injection molded product composed of said polymers; and
recovering said product from said mold.

2. Process according to claim 1, wherein said anionic polymerization catalyst is at least one of: alkali metal, alkali metal compound, Grignard compound, or mixtures thereof.

3. Process according to claim 1, wherein said activator is a lactam terminated isocyanate, or an acyl lactam compound.

4. Process according to claim 3, wherein said activator is the reaction product of a high molecular weight polyol and a compound providing the activator group.

5. Process according to claim 4, wherein said polymeric polyol is a diol, triol, tetrol or a combination thereof.

6. Process according to claim 4, wherein the equivalent weight of said polymeric polyol is at least 300.

7. Process according to claim 1, wherein said polyol is a polyether polyol, polyester polyol, polybutadiene polyol, grafted polyether polyol, the polyurea-dispersions in polyetherpolyol, or in polyesterpolyol, or a mixture thereof.

8. Process according to claim 1, wherein said polyisocyanate is an aromatic polyisocyanate, an aliphatic polyisocyanate, an araliphatic polyisocyanate, a cycloaliphatic polyisocyanate or a mixture thereof.

9. Process according to claim 1, wherein said polyurethane catalyst is tertiary amine, a tin salt of a carboxylic acid or a mixture thereof.

10. Process according to claim 1, wherein the mold temperature is between about 100° C. and about 250° C.

11. Process according to claim 1, wherein said residence time of said mixture in said mold is between 10 seconds and 10 minutes.

12. A reaction injection molded product prepared by the process of claim 1.

13. A reaction injection molded product composed of a polyamide polymer and polyurethane polymer.

14. A product according to claim 13 wherein said product is an interpenetrating polymer network of said polyamide polymer and said polyurethane polymer in which both polymers are cross-linked independently.

15. A product according to claim 13 wherein only one of said polyamide polymer or said polyurethane polymer is substantially linear or branched.

16. A product according to claim 13 wherein both said polyamide and said polyurethane polymer are substantially linear or branched.

17. A product according to claim 15, wherein said polyamide polymer is branched.

18. A product according to claim 16, wherein said polyamide polymer is branched.

19. Process according to claim 1 wherein the weight ratio of polyurethane forming compounds to polyamide forming compounds is from 95:5 to 5:95.

20. A product according to claim 14, wherein the weight ratio of polyurethane to polyamide is from about 95:5 to 5.95.

21. Process according to claim 1, where in said process the mold temperature is between about 100° C. and about 250° C. and the residence time of said mixture in said mold is between 10 seconds and 10 minutes.

* * * * *